(12) United States Patent
Cael et al.

(10) Patent No.: US 10,155,597 B2
(45) Date of Patent: Dec. 18, 2018

(54) ARTIFICIAL SATELLITE

(71) Applicant: AIRBUS DEFENCE AND SPACE SAS, Les Mureaux (FR)

(72) Inventors: Philippe Cael, Toulouse (FR); Andrew Walker, Toulouse (FR); Fabrice Mena, Toulouse (FR)

(73) Assignee: AIRBUS DEFENCE AND SPACE SAS, Les Mureaux (FR)

( * ) Notice: Subject to any disclaimer, the term of this patent is extended or adjusted under 35 U.S.C. 154(b) by 0 days.

(21) Appl. No.: 15/750,980

(22) PCT Filed: Aug. 10, 2016

(86) PCT No.: PCT/FR2016/052062
§ 371 (c)(1),
(2) Date: Feb. 7, 2018

(87) PCT Pub. No.: WO2017/025691
PCT Pub. Date: Feb. 16, 2017

(65) Prior Publication Data
US 2018/0237168 A1 Aug. 23, 2018

(30) Foreign Application Priority Data
Aug. 10, 2015 (FR) .................................... 15 01701

(51) Int. Cl.
*B64G 1/50* (2006.01)
*B64G 1/10* (2006.01)
(Continued)

(52) U.S. Cl.
CPC ........... *B64G 1/1007* (2013.01); *B64G 1/226* (2013.01); *B64G 1/44* (2013.01); *B64G 1/503* (2013.01); *B64G 2001/1092* (2013.01)

(58) Field of Classification Search
CPC .................................. B64G 1/50; B64G 1/503
See application file for complete search history.

(56) References Cited

U.S. PATENT DOCUMENTS 5,833,175 A 11/1998 Caplin
6,478,258 B1 11/2002 Yee
(Continued)

FOREIGN PATENT DOCUMENTS

EP 2 772 442 A2 9/2014
JP 2003-312600 11/2003
(Continued)

OTHER PUBLICATIONS

International Search Report, dated Nov. 15, 2016, from corresponding PCT/FR2016/052062 application.
(Continued)

*Primary Examiner* — Brian M O'Hara
(74) *Attorney, Agent, or Firm* — Young & Thompson (57) ABSTRACT

Disclosed is an artificial satellite including one face from the North face and the South face supporting at least one main radiator having an outer face turned towards space and an inner face opposite the outer face. The satellite includes a bearing structure carrying the North face, the South face, the East face and the West face. At least one part of the at least one main radiator protrudes from at least one face from the East face and the West face. The inner face of the at least one protruding part is covered with a high infrared emissivity material. The value of the dimension of the at least one protruding part is between 19% and 50% of the value of the distance between the East and West faces.

11 Claims, 5 Drawing Sheets

(51) Int. Cl.
*B64G 1/22* (2006.01)
*B64G 1/44* (2006.01)

(56) References Cited

U.S. PATENT DOCUMENTS

| | | | |
|---|---|---|---|
| 7,874,520 | B2 | 1/2011 | McKinnon et al. |
| 8,616,271 | B2 | 12/2013 | Hugon et al. |
| 8,820,684 | B2 * | 9/2014 | McKinnon ............... B64G 1/50 |
| | | | 244/171.8 |
| 9,073,646 | B2 | 7/2015 | Balemboy et al. |
| 9,352,855 | B2 * | 5/2016 | Wong ..................... B64G 1/503 |
| 9,828,116 | B1 * | 11/2017 | Mena ....................... B64G 1/50 |
| 2008/0257525 | A1 | 10/2008 | Ohnishi et al. |
| 2014/0097981 | A1 | 4/2014 | Celerier |
| 2014/0299714 | A1 | 10/2014 | Wong |

FOREIGN PATENT DOCUMENTS

| | | |
|---|---|---|
| JP | 2008-222210 | 9/2008 |
| JP | 2008-265522 | 11/2008 |
| JP | 2009-530188 | 8/2009 |
| JP | 2012-526694 | 11/2012 |
| JP | 2017-537845 | 12/2017 |

OTHER PUBLICATIONS

Japanese Office Action for Application No. 2018-506564, with English translation provided.

* cited by examiner

ARTIFICIAL SATELLITE

BACKGROUND OF THE INVENTION

Field of the Invention

The present invention relates to the field of artificial satellites. In particular, it relates to the structure of geostationary telecommunication satellites.

Description of the Related Art

It is desirable that satellites have small dimensions, on the one hand, to be able to be arranged in current air transport means, transport by boat being a lot slower, and on the other hand, such that they can be launched by launchers that have a fairing with a small diameter. Indeed, during launching, geostationary satellites are arranged under the fairing of the launchers. In particular, the Proton rocket which enables to launch heavy loads, have a circular space under the fairing with a small diameter, since this is equal to 3.90 meters.

Moreover, manufacturers of satellites have the ambition of installing radiators with large dimensions on the North and South faces of satellites to be able to cool a forever increasing number of electronic equipment, and, at the same time, of installing reflectors with a large diameter on the East and West faces, to improve the quality of emitting and receiving.

Figure 1:
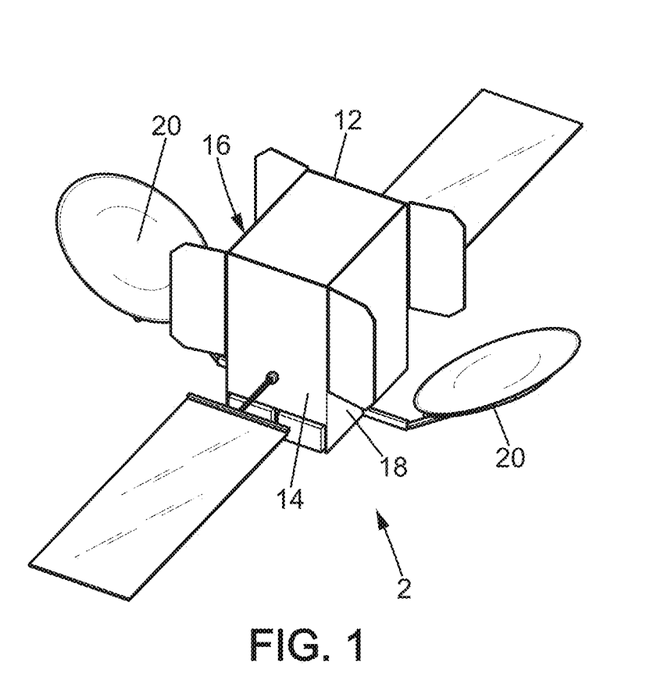
FIG. 1 is a schematic, perspective view of a geostationary satellite according to the state of the art.

To satisfy these conflicting requirements, the document U.S. Pat. No. 5,833,175 proposes a geostationary satellite 2 represented in FIG. 1. This satellite has East 16 and West 18 faces of a greater length than the North 12 and South 14 faces, such that the reflectors 20 with a large diameter can be assembled on them. To increase the heat rejection capacity of the radiators, this document proposes to install radiators that can be deployed on the North and South faces. However, the use of deployable radiators involves the use of a deployment mechanism, fluid loops with flexible fluid connections. This is a more complex, more expensive, and more risky solution than using fixed radiators. In addition, deployable radiators for this satellite protrude over a great length, which impedes the emission of signals towards lateral reflectors, such that with deployable radiators, it is more difficult to assemble more than one single reflector on each one of the East and West faces. Finally, the satellite in the document U.S. Pat. No. 5,833,175 has a low lift capacity and does not enable a large chamber to be accommodated.

Document U.S. Pat. No. 6,478,258 discloses a satellite having a north face supporting a main radiator, at least a portion of which is projecting from at least one face of the east face and the west face. The document US 2014/0299714 discloses a satellite having a thermal regulation panel 212 attached in parallel and at a distance from a main radiator.

SUMMARY OF THE INVENTION

The present invention aims to propose a satellite that has the capacity to support significant loads, that has a large heat rejection capacity, that can accommodate a chamber of a significant size and more than two reflectors, while having a good transmission quality.

To this end, the invention proposes an artificial satellite comprising a North face, a South face opposite the North face, an East face and a West face opposite the East face; said satellite comprising a longitudinal direction which extends in the launch direction, a first direction perpendicular to the longitudinal direction and a second direction perpendicular to the longitudinal direction and to the first direction, said North and South faces being perpendicular to said first direction, said East and West faces being perpendicular to said second direction, the distance between the East and West faces measured along the second direction being less than the distance between the North and South faces measured along the first direction, one face from the North face and the South face, supporting at least one main radiator that has an outer face turned towards space and an inner face opposite the outer face, at least one part of said at least one main radiator protruding in relation to the at least one face from the East face and the West face.

characterized in that the satellite comprises a bearing structure carrying the North face, the South face, the East face and the West face, and in that; the inner face of said at least one protruding part is covered with a material having an infrared emissivity higher than 0.7, and in that the value of the dimension of said at least one protruding part measured along the direction is between 19% and 50% of the value of the distance between the East and West faces measured along the second direction.

Advantageously, this satellite comprises a large radiative surface, and enables the installation of several reflectors.

Thus, advantageously, the inner faces of the protruding parts enable to release an additional quantity of heat towards space.

Thus, the protruding parts can have a reasonable dimension and do not impede the emitting and receiving of signals by reflectors of the satellite. Moreover, extensions that are too large could have rigidity problems. In addition, the view factor towards space of the inner parts of the extensions decreases with their size.

Advantageously, this satellite configuration is simple, reliable and cheaper. It also enables the use of reflectors with a large diameter.

According to specific embodiments, the connection device comprises one or several of the following characteristics:

The value of the dimension of said at least one protruding part measured along the direction is between 23% and 33% of the value of the distance between the East and West faces measured along the second direction.

A part of the at least one main radiator protrudes in relation to the East face and another part of the at least one main radiator protrudes in relation to the West face.

The at least one protruding part of the inner face of said main radiator is coated with a reflective material, preferably an optical solar reflector type material. Advantageously, this coating is more effective.

The at least one protruding part of the inner face of said main radiator is coated with white paint. Advantageously, this coating is cheaper and avoids specular multi-reflections towards antennae and East-West faces.

The at least one protruding part of the inner face of said main radiator is coated with black paint. Advantageously, this coating is cheaper. It is less effective than a white paint coating or an optical solar reflector (OSR) type coating, when solar radiation is incident, but this loss of effectiveness is compensated by the fact that the corresponding outer face receives no solar radiation.

The dimension between an end of the North face and an end of the South face diametrically opposite each other, is less than 3.9 meters. Advantageously, such a satellite can be launched by the Proton launcher. It is also compatible with a greater number of current transport aircraft.

The bearing structure is a cylindrical structure that has a diameter substantially equal to 1.666 meters and wherein the distance between the East and West faces measured along the second direction is more than 1.7 meters.

Advantageously, an inner bearing structure of this diameter enables, on the one hand, to increase the capacity of lifting a significant load from the satellite, and on the other hand, to accommodate large chambers inside. The diameter of 1.666 is a standard interface diameter with launchers, well adapted to telecommunication satellites. The diameter near the bearing structure enables to have a more effective load-to-launch transfer.

Advantageously, as the distance between the East and West faces is low, there is enough space in the space under the fairing to install several antennae on the East and West faces.

Advantageously, the load pathways on the North and South faces are recovered.

The satellite comprises at least one antenna reflector and wherein said at least one protruding part has a lateral notch crossed by a part of said at least one antenna reflector.

The satellite comprises solar panels attached to the North face and to the South face, the dimension of the solar panels along the second direction is substantially equal to the North face dimension and to the South face dimension, along said second direction.

BRIEF DESCRIPTION OF THE DRAWINGS

The invention will be best understood upon reading the description which will follow, given only as an example and made in reference to the figures, whereon.

DESCRIPTION OF THE PREFERRED EMBODIMENTS

Figure 2:
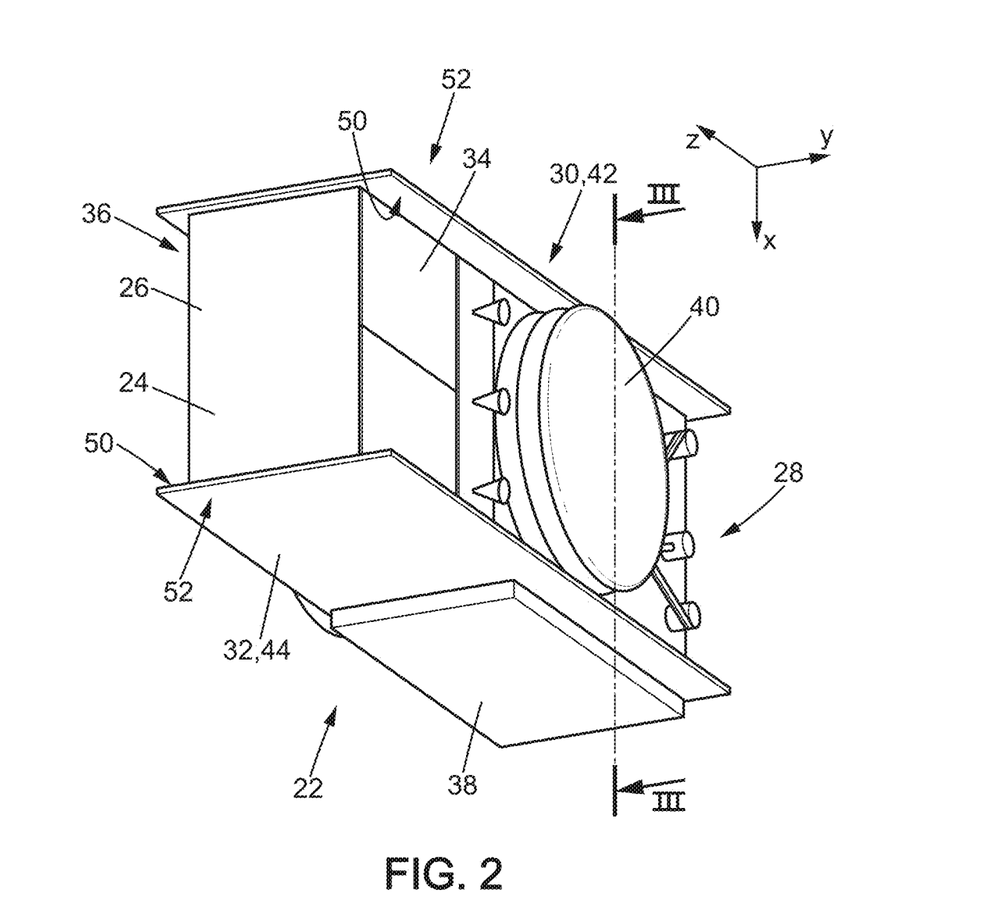
FIG. 2 is a schematic, perspective view of an artificial satellite according to the present invention.

The present invention is defined in relation to an orthogonal marker R (x, y, z) represented in FIG. 2. Conventionally, in the description which will follow, the direction z of the marker R (x, y, z) is called "longitudinal direction" and is oriented in the launch direction, the direction x of this marker is called "first direction" and the direction y of this marker is called "second direction".

Figure 3:
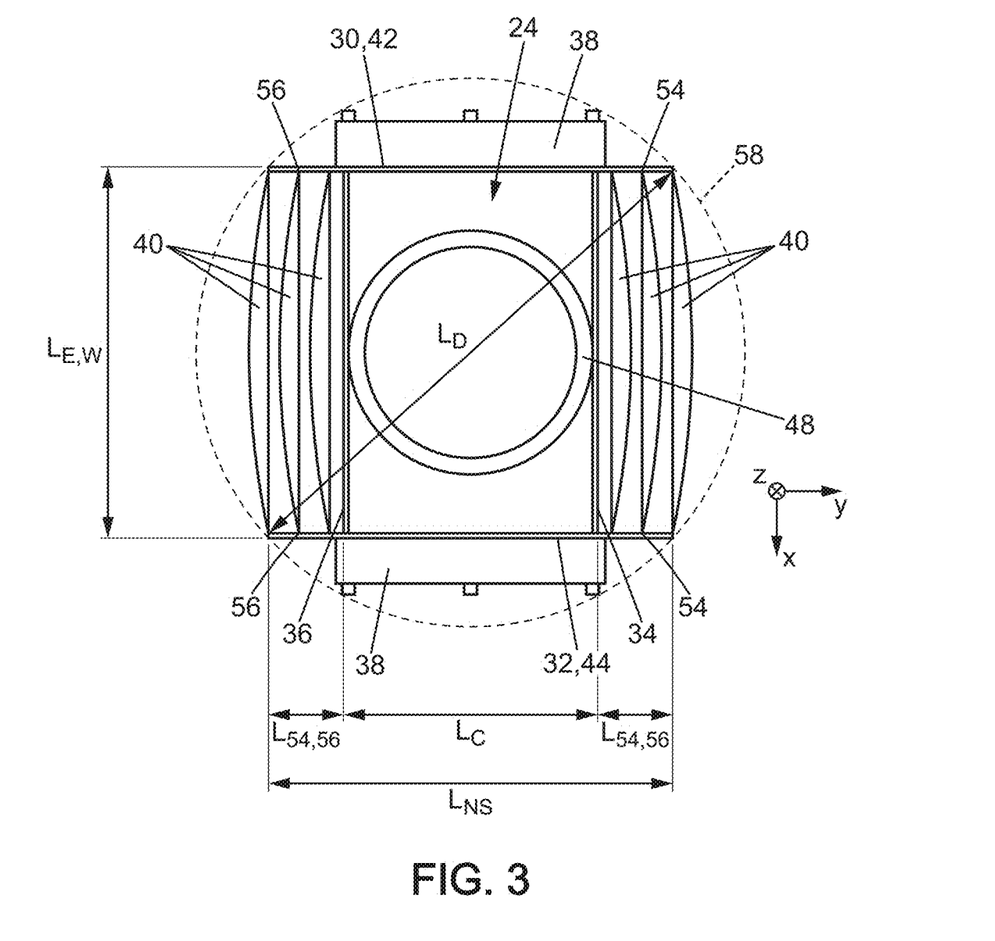
FIG. 3 is a schematic, cross-section view according to the slice plane III-III of the satellite illustrated in FIG. 2, the space under the fairing being represented by a dotted line.

In reference to FIGS. 2 and 3, the artificial satellite 22 according to the invention comprises an Earth face 26, an anti-Earth face 28, a North face 30, a South face 32 opposite the North face, an East face 34 and a West face 36 opposite the East face and a bearing structure 48 carrying the Earth 26, anti-Earth 28, North 30, South 32, East 34, West 36 faces.

Preferably, the bearing structure 48 is cylindrical. Also, preferably, the bearing structure 48 has a diameter of around 1.666 meters.

The Earth 26, anti-Earth 28, North 30, South 32, East 34, West 36 faces form a rectangular box 24. In particular, the North 30 and South 32 faces are parallel to each other and perpendicular to the first direction x. Likewise, the East 34 and West 36 faces are parallel to each other and perpendicular to the second direction y. The Earth 26, anti-Earth 28, North 30, South 32, East 34, West 36 faces form a rectangular box 24. The solar panels 38 are attached on the North 30 and South 32 faces. Three antennae of the useful telecommunication load composed of reflectors 40 and an RF source 46 are attached on the East 34 and West 36 faces.

The North face 30 and the South face 32 each carry a main radiator 42, 44.

The main radiators 42, 44 are intended to cool the electronic equipment contained in the box 24. This electronic equipment, not represented in the figures, is thermally connected to the main radiators 42, 44, for example, by the intermediary of heat pipes, also not represented. The main radiators 42, 44 each have an inner face 50 turned towards and attached to a face of the box, and an outer face 52 turned towards space. The outer face 52 of these radiators is covered with a high infrared emissivity and low solar absorption material, for example, an Optical Solar Reflector type coating, generally called OSR.

A high emissivity is defined according to the present invention as an emissivity higher than 0.7. A low solar absorption is defined according to the present invention as an absorption lower than 0.3.

The North 30 and South 32 faces extend beyond the Earth face 26 and beyond the anti-Earth face 28.

The North 30 and South 32 faces also extend beyond the East face 34 and the West face 34. As both the North 30 and South 32 faces carry main radiators 42, 44, a part 54 of the main radiators protrudes in relation to the East face 34 and another part 56 of the main radiators protrudes in relation to the West face 36. The inner face 50 of these protruding radiator parts 54, 56 is covered with a high infrared emissivity and low solar absorption material. Thus, not only the outer face 52 of the main radiators, but also the inner face 50 of the protruding radiator parts 54, 56, enables heat to be dissipated. Optical solar reflectors (OSRs) can thus be used, which is the most effective coating, but also the most expensive and which has the disadvantage of causing unwanted specular reflections from the sun towards the East or West face or towards the antennae. Advantageously, cheaper white paint is used, which does not have this disadvantage.

It is also advantageous to use black paint, which has a high infrared emissivity. It is less effective than white paint, when the inner face 50 is lit up by the sun, but it is cheaper, and the loss of effectiveness is compensated in part by the fact that the outer face 52 of the radiator, which is therefore not lit up by the sun, is more effective.

Thus, by covering the inner face 50 of the protruding radiator parts 54, 56, the inventors have been able to experience, that when, the value of the dimension $L_{54,56}$ of each protruding radiator part 54, 56 is between 19% and 50% of the value of the distance $L_C$ between the East 34 and West 36 faces measured along the second direction y, the quantity of heat able to be dissipated by the main radiators is sufficient to enable the installation of a large amount of electronic equipment. Thus, the satellite according to the present invention verifies the following relationship:

$$19\% < L_{54,56}/L_C < 50\%$$

Preferably, according to the present invention, the value of the dimension $L_{54,56}$ of each protruding radiator part 54,56 is between 19% and 33% of the value of the distance $L_C$ between the East 34 and West 36 faces measured along the second direction y.

Preferably, according to the present invention, the value of the dimension $L_{54,56}$ of each protruding radiator part 54,56 is between 23% and 33% of the value of the distance $L_C$ between the East 34 and West 36 faces measured along the second direction y.

As can be seen in FIG. 3, according to the present invention, the North 30 and South 32 faces have the same dimension $L_{NS}$ along the second direction y. The East 34 and West 36 faces have the same dimension $L_{EW}$ along the first direction x.

Thus, advantageously, the configuration of the satellite according to the present invention enables the installation of reflectors with a large diameter.

Also, according to the present invention, the lateral dimension $L_C$ of the box 24 is more than 1.7 meters. This lateral dimension $L_C$ is, for example, equal to 1.8 meters. This lateral dimension $L_C$ is the distance $L_C$ between the East 34 and West 36 faces measured along the second direction y. This arrangement enables to radiators to extend in the direction −Z outside the bearing structure 48, such that the launch forces on the North and South faces are thus recovered by the bearing structure, while leaving a space to accommodate the large size equipment inside the satellite on the East 34 or West 36 face opposite the inner structure 48.

This configuration advantageously enables to install three reflectors 40 on the East 34 and West 36 faces, while remaining in the space under the fairing 58.

Also, the dimension $L_D$ between an end of the North face 30 and an end of the South face 32 diametrically opposite is less than 4 meters and is preferably less than 3.9 meters.

Figure 4:
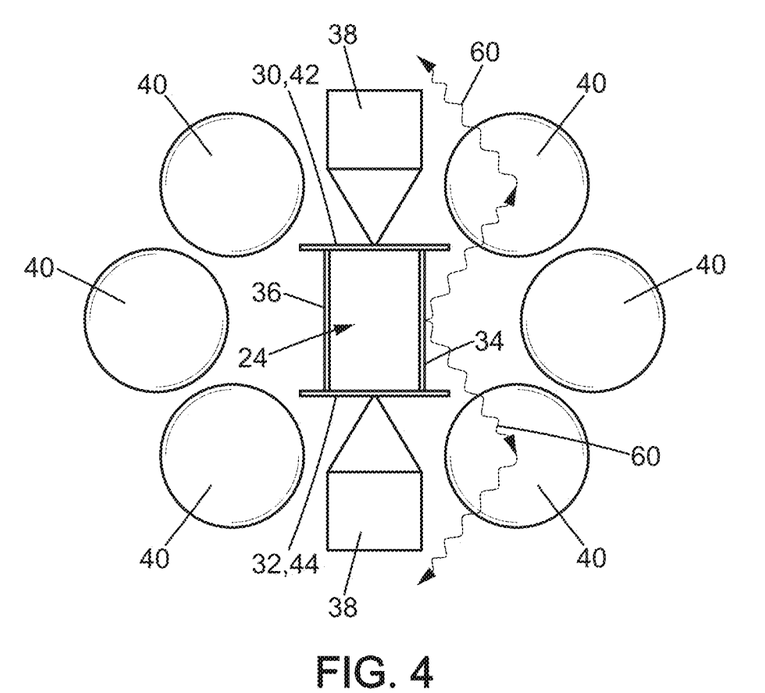
FIG. 4 is a schematic view of the satellite illustrated in FIGS. 2 and 3 when the reflectors and the solar panels are deployed.

As the dimension $L_{54,56}$ of the protruding radiator parts 54,56 is not important, emitting and receiving signals 60 are not impeded by these radiator parts, as FIG. 4 shows. The reduction of the surface for assembling equipment on the North 30 and South 32 faces connected to the reduction of the distance $L_C$ between the East 34 and West 36 faces is compensated for by assembling certain electronic equipment inside the satellite, for example, on equipment-carrying horizontal plates connected to the central bearing structure 48 or on the East 34 and West 36 faces.

In the embodiment represented in FIG. 3, the width of the solar panels 38 is more than the lateral dimension $L_C$ of the box 24. This dimension can thus be expanded within the limitations of the fairing of the launcher. The use of wide solar panels 38 enables to reduce the number of solar panels on the solar generator.

Figure 5:
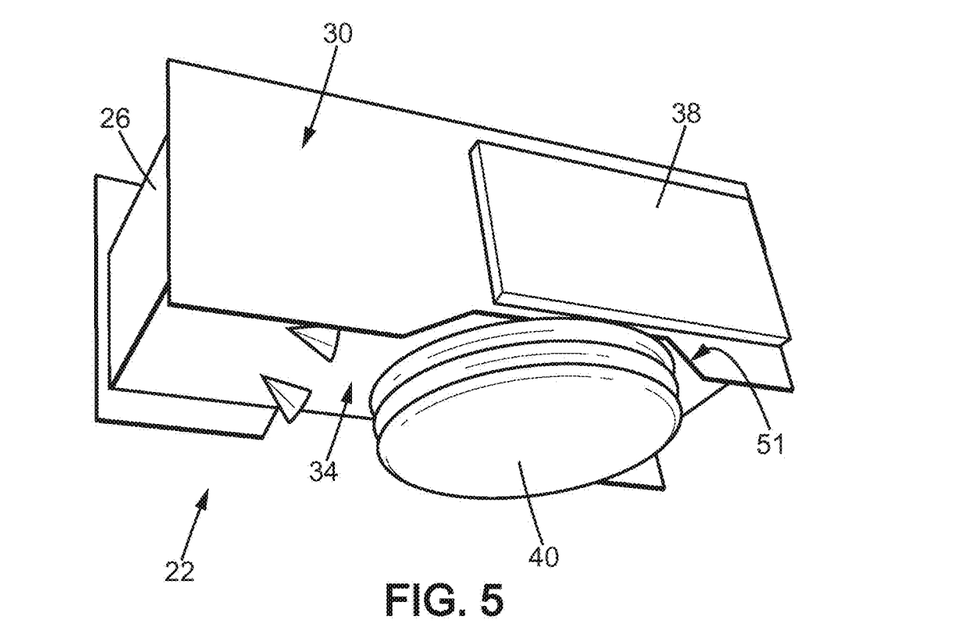
FIG. 5 is a schematic, perspective view of a variant of an embodiment of the artificial satellite according to the invention.

Advantageously, according to the variant represented in FIG. 5, the protruding parts have a lateral notch 51 to enable the accommodation of a reflector 40 of a diameter more than the distance $L_{E,W}$ between the North 30 and South 32 faces measured along the first direction x. This lateral notch is made by cutting a lateral strip from the main radiator over a length, slightly longer than the length of the reflector part which extends beyond the North face or the South face. This notch 50 is crossed by a part of the antenna reflectors 40.

In this case, the solar panels 38 have a width substantially equal to the lateral dimension $L_C$ of the box 24, so as to avoid any mechanical interference with the reflectors 40. With a view to industrialize the manufacture of a satellite, cuts 51 are or are not to be made according to the specifications of the client.

As an alternative, according to the present invention, the value of the dimension $L_{54,56}$ of each protruding radiator part 54,56 is between 23% and 50% of the value of the distance $L_C$ between the East 34 and West 36 faces measured along the second direction y.

According to a variant not represented, the satellite 22 only has one single main protruding radiator part, so as to enable the accommodation of one or several reflectors of a large diameter on the opposite face thereof. In this case, the protruding radiator part extends protruding in relation to the East face or in relation to the West face. According to this variant, the range of values of the dimension $L_{54}$ or $L_{56}$ of said protruding part 54 or 56 is identical to the ranges of values mentioned above for each protruding radiator part in the case where there are two protruding radiator parts.

In a variant, one or both main radiators are replaced by several radiators adjacent to each other. Thus, the lower part (towards −Z) can be connected to the platform equipment, and the upper part to equipment with a useful load.

The invention claimed is:

1. An artificial satellite comprising:
a North face;
a South face opposite the North face;
an East face;
a West face opposite the East face; and
a bearing structure carrying the North face, the South face, the East face and the West face,
wherein said satellite has a longitudinal direction which extends in a launch direction, a first direction perpendicular to the longitudinal direction and a second direction perpendicular to the longitudinal direction and the first direction, said North and South faces being perpendicular to said first direction, said East and West faces being perpendicular to said second direction, the distance between the East and West faces measured along the second direction being less than the distance between the North and South faces measured along the first direction, one face from the North face and the South face, supporting at least one main radiator that has an outer face turned towards space and an inner face opposite the outer face, at least one part of said at least one main radiator protruding in relation to at least one of the East face and the West face, and
the inner face of said at least one protruding part is covered with a material having an infrared emissivity higher than 0.7, a value of a dimension of said at least one protruding part measured along the second direction being between 19% and 50% of the value of the distance between the East and West faces measured along the second direction.

2. The artificial satellite according to claim 1, wherein the value of the dimension of said at least one protruding part measured along the second direction is between 23% and 33% of the value of the distance between the East and West faces measured along the second direction.

3. The artificial satellite according to claim 1, wherein a part of the at least one main radiator protrudes in relation to the East face and another part of the at least one main radiator protrudes in relation to the West face.

4. The artificial satellite according to claim 1, wherein the inner face of the at least one protruding part of said main radiator is coated with a reflective material.

5. The artificial satellite according to claim 4, wherein the reflective material is an optical solar reflector type material.

6. The artificial satellite according to claim 1, wherein the inner face of at least one protruding part of said main radiator is coated with white paint.

7. The artificial satellite according to claim 1, wherein the inner face of at least one protruding part of said main radiator is coated with black paint.

8. The artificial satellite according to claim 1, wherein the dimension between an end of the North face and an end of the South face diametrically opposite is less than 3.9 meters.

9. The artificial satellite according to claim 1, wherein the bearing structure is a cylindrical structure that has a diameter substantially equal to 1.666 meters, and wherein the distance between the East and West faces measured along the second direction is more than 1.7 meters.

10. The artificial satellite according to claim 1, further comprising at least one antenna reflector, wherein said at least protruding part has a lateral notch crossed by a part of said at least one antenna reflector.

11. The artificial satellite according to claim 1, further comprising solar panels attached to the North face and to the South face, a dimension of the solar panels along the second direction being substantially equal to the dimension of the North face and to the dimension of the South face, along said second direction.

\* \* \* \* \*